(12) United States Patent
Hsieh

(10) Patent No.: US 7,575,403 B2
(45) Date of Patent: Aug. 18, 2009

(54) FASTENER FOR SECURING A CARGO CONTAINER

(76) Inventor: David Hsieh, 3F, No. 2, Chin-Chung St., Taichung City (TW)

( * ) Notice: Subject to any disclaimer, the term of this patent is extended or adjusted under 35 U.S.C. 154(b) by 556 days.

(21) Appl. No.: 11/465,855

(22) Filed: Aug. 21, 2006

(65) Prior Publication Data

US 2006/0280573 A1    Dec. 14, 2006

Related U.S. Application Data

(63) Continuation-in-part of application No. 11/062,070, filed on Feb. 18, 2005, now Pat. No. 7,101,130.

(30) Foreign Application Priority Data

Sep. 12, 2005    (TW) .............................. 94215678 U

(51) Int. Cl.
*B60P 7/08* (2006.01)
(52) U.S. Cl. ............................. 410/85; 410/77; 410/100
(58) Field of Classification Search .................. 410/85, 410/96, 97, 100, 80, 81, 77; 114/75; 24/265 CD; 248/499
See application file for complete search history.

(56) References Cited

U.S. PATENT DOCUMENTS 6,666,634 B1    12/2003    Hsieh
7,101,130 B2 *  9/2006    Hsieh .......................... 410/85

* cited by examiner

*Primary Examiner*—Stephen Gordon
(74) *Attorney, Agent, or Firm*—Baker & Daniels LLP

(57) ABSTRACT

A fastener for securing a cargo container includes: a first fastener component including a pair of rails; amounting seat mounted slidably on the rails; a second fastener component including a toothed part extending into the a central through-hole in the mounting seat and formed with teeth, each of which has a contact surface; and an engagement unit including an engaging element that is mounted in a retaining recess in the mounting seat and that has a free end portion extendable into the central through-hole in the mounting seat. The free end portion of the engaging element has a flat contact surface that extends into the central through-hole to abut against the contact surface of an adjacent one of the teeth in such a manner to arrest rotation of the mounting seat relative to the second fastener component in a direction.

1 Claim, 6 Drawing Sheets

FASTENER FOR SECURING A CARGO CONTAINER

CROSS-REFERENCE TO RELATED APPLICATION

This application is a continuation-in-part (CIP) of U.S. patent application Ser. No. 11/062,070, now U.S. Pat. No. 7,101,130, filed by the applicant on Feb. 18, 2005, and claims the priority of Taiwanese Application No. 094215678, filed on Sep. 12, 2005.

BACKGROUND OF THE INVENTION

1. Field of the Invention

The present invention relates to a fastener for a cargo container, more particularly to a fastener having a non-spherical shaped engaging element and a threaded shaft with a toothed part for engaging the engaging element.

2. Description of the Related Art

In U.S. Patent Application Ser. No. 11/062,070, now U.S. Pat. No. 7,101,130, the applicant disclosed a fastener that includes a mounting seat slidable on a pair of rails and formed with a central hole and a retaining recess, a threaded shaft extending threadedly through a fixed body interconnecting the rails, a toothed part extending from the threaded shaft into the central hole, and a spring-biased spherical engagement element received in the retaining recess and protruding into the central hole to be associated operably with the toothed part so as to arrest rotation of the mounting seat relative to the threaded shaft in a first direction and so as to permit rotation of the mounting seat relative to the threaded shaft in a second direction opposite to the first direction. However, since the engagement element is spherical in shape, the contact area between the engagement element and the toothed part is relatively small, which can result in an adverse effect on the fastening effect of the fastener.

SUMMARY OF THE INVENTION

Therefore, the object of the present invention is to provide a fastener that has a larger contact area between an engagement element and a toothed part of the fastener so as to enhance the fastening effect of the fastener.

Accordingly, the present invention provides a fastener for securing a cargo container which comprises: a first fastener component including first and second fixed bodies, and a pair of rails bridging the first and second fixed bodies, the first fixed body having a screw hole; a mounting seat mounted slidably on the rails for sliding along the rails and having a central through-hole aligned with the screw hole in an axial direction, and a retaining recess in spatial communication with and extending in a tangential direction from the central through-hole; a second fastener component including a threaded shaft extending threadedly through the screw hole in the first fixed body toward the second fixed body, and a toothed part extending axially from the threaded shaft into the central through-hole in the mounting seat and formed with a plurality of angularly displaced teeth, each of which has a contact surface extending in the axial direction; and an engagement unit including an urging member that is mounted in the retaining recess in the mounting seat, and an engaging element that is mounted in the retaining recess in the mounting seat, that is urged by the urging member, and that has a free end portion extendable into the central through-hole in the mounting seat and in contact with at least one of the teeth upon relative rotation between the mounting seat and the second fastener component. The engaging element is movable in the tangential direction such that the free end portion can be retracted into the retaining recess in the mounting seat. The free end portion of the engaging element has a flat contact surface that extends in the tangential direction and the axial direction, and that extends into the central through-hole in the mounting seat to abut against the contact surface of an adjacent one of the teeth of the toothed part in such a manner to arrest rotation of the mounting seat relative to the second fastener component in a first direction. The free end portion of the engaging element further has a curved contact surface that extends curvedly from the flat contact surface such that the curved contact surface is in sliding contact with the contact surfaces of the teeth of the toothed part one by one and that the free end portion of the engaging element is retracted into the retaining recess by pushing action of the teeth of the toothed part against urging action of the urging member during rotation of the mounting seat relative to the second fastener component in a second direction opposite to the first direction.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

The construction of a preferred embodiment of the fastener according to the present invention will now be described in greater detail below.

Figure 1:
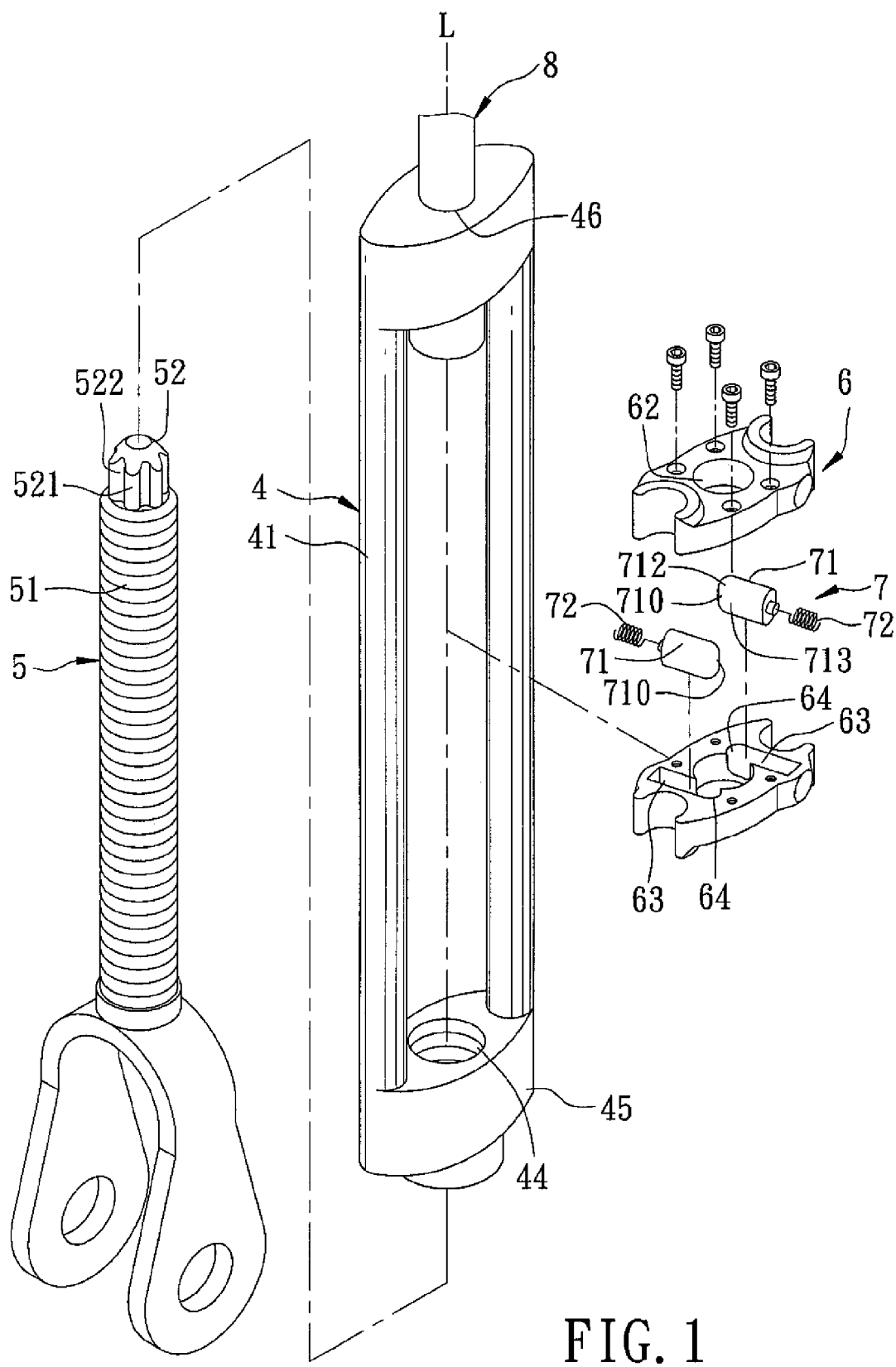
FIG. 1 is a fragmentary exploded perspective view of the preferred embodiment of the fastener according to the present invention.
Figure 2:
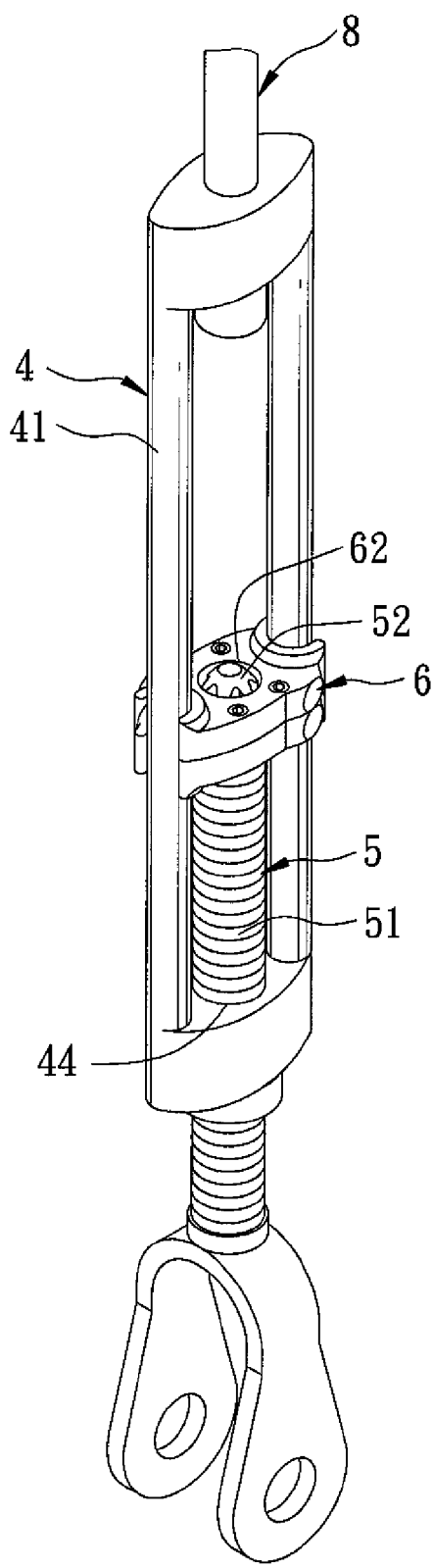
FIG. 2 is a fragmentary assembled perspective view of the preferred embodiment.
Figure 3:
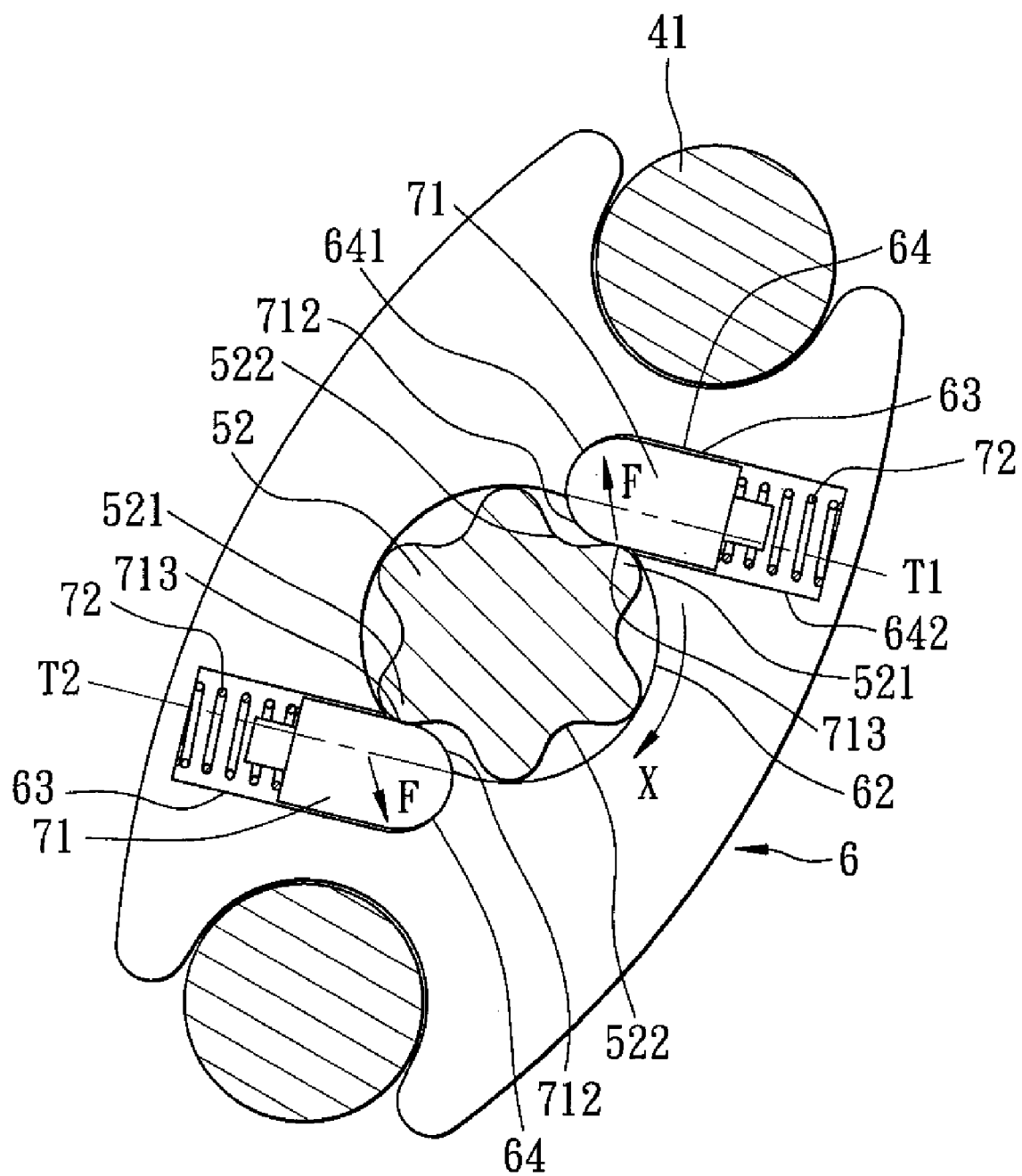
FIG. 3 is a sectional view of the preferred embodiment, showing how rotation of a mounting seat is arrested by a toothed part of a second fastener component.
Figure 4:
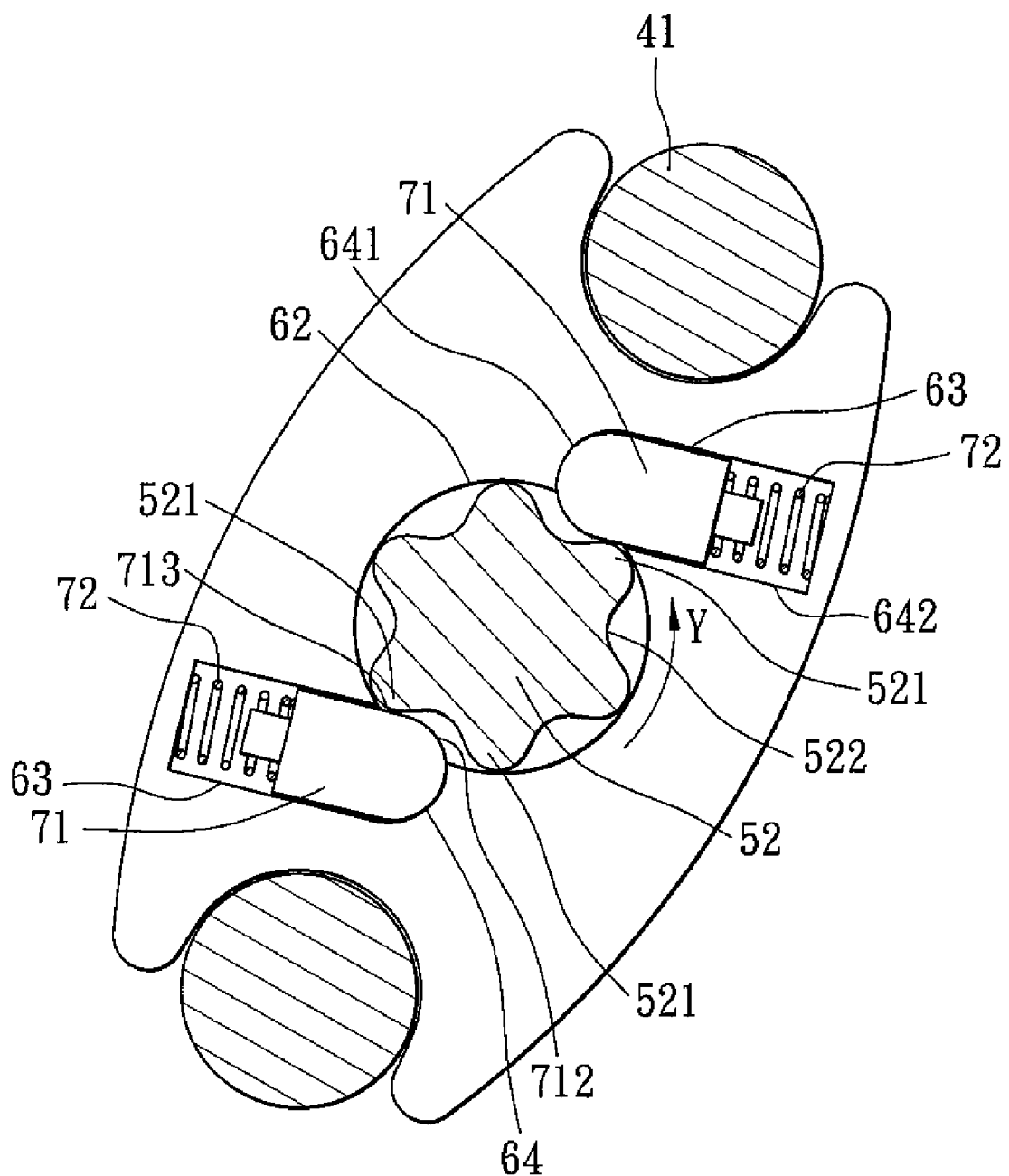
FIGS. 4 and 5 are sectional views of the preferred embodiment, showing how rotation of the mounting seat relative to the second fastener component is permitted.
Figure 5:
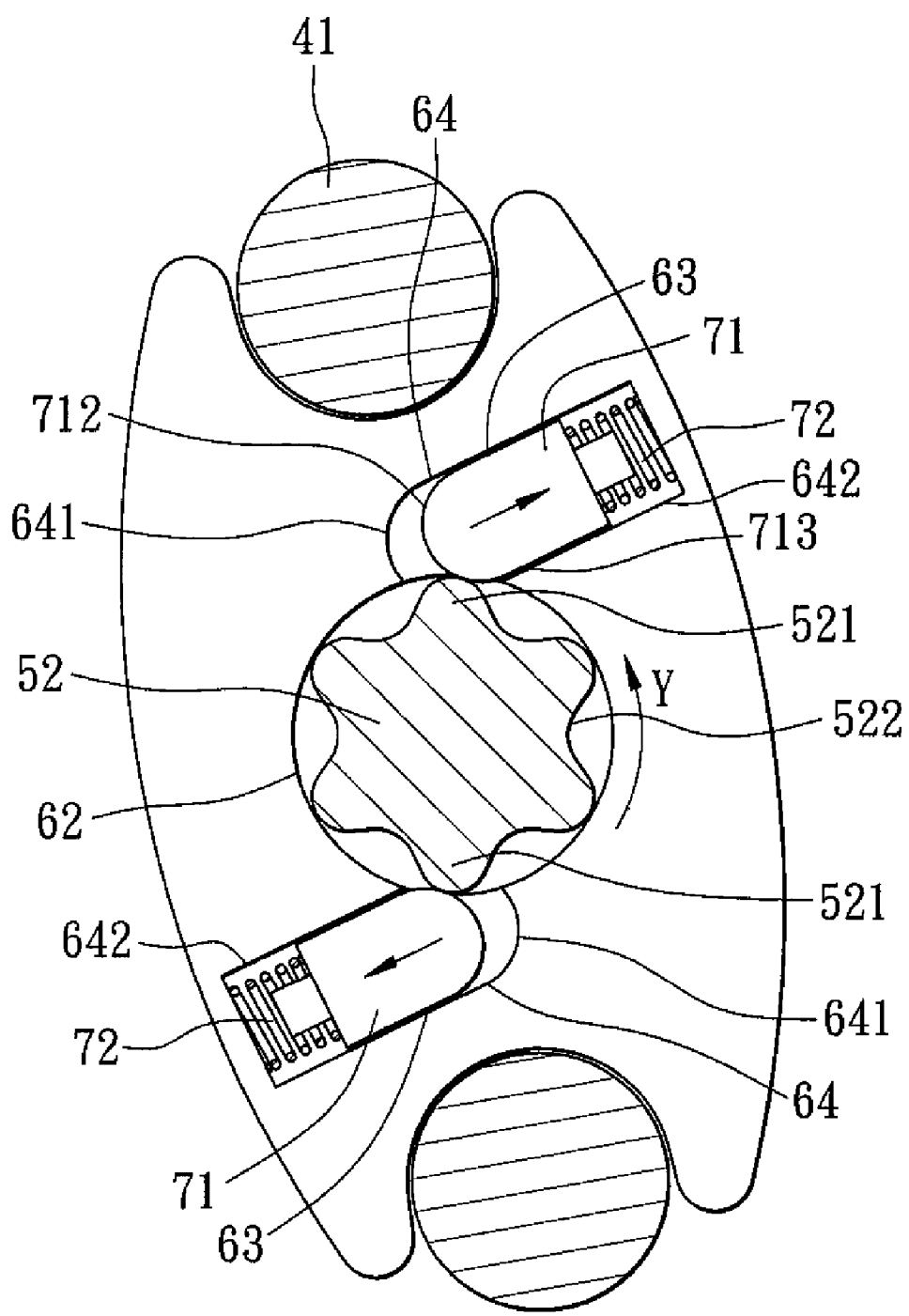

With reference to FIGS. 1 to 3, a fastener for securing a cargo container according to a preferred embodiment of the present invention includes: a first fastener component 4 including first and second fixed bodies 45, 46, and a pair of rails 41 bridging the first and second fixed bodies 45, 46, the first fixed body 45 having a screw hole 44; a mounting seat 6 mounted slidably on the rails 41 for sliding along the rails 41 and having a central through-hole 62 aligned with the screw hole 44 in an axial direction (L), and a pair of opposite retaining recesses 63 in spatial communication with and extending in tangential directions (T1, T2) from the central through-hole 62; a second fastener component 5 including a threaded shaft 51 extending threadedly through the screw hole 44 in the first fixed body 45 toward the second fixed body 46, and a toothed part 52 extending axially from the threaded shaft 51 into the central through-hole 62 in the mounting seat 6 and formed with a plurality of angularly displaced teeth 521, each of which has a contact surface 522 extending in the axial direction (L); and an engagement unit 7 including a pair of urging members 72 that are respectively mounted in the retaining recesses 63, and a pair of engaging elements 71 that are respectively mounted in the retaining recesses 63 in the mounting seat 6, that are respectively urged by the urging members 72, and that respectively have free end portions 710, each of which is extendable into the central through-hole 62 in the mounting seat 6 and each of which is in contact with at least one of the teeth 521 upon relative rotation between the mounting seat 6 and the second fastener component 5. Each of the engaging elements 71 is movable in the respective tangential direction (T1, T2) such that the free end portion 710 thereof can be retracted into the respective retaining recess 63 in the mounting seat 6. The free end portion 710 of each engaging element 71 has a flat contact surface 713 that extends in the respective tangential direction (T1, T2) and the axial direction (L), and that extends into the central through-hole 62 in the mounting seat 6 to abut against the contact surface 522 of an adjacent one of the teeth 521 of the toothed part 52 in such a manner to arrest rotation of the mounting seat 6 relative to the second fastener component 5 in a first direction (X) (see FIG. 3). The free end portion 710 of each engaging element 71 further has a curved contact surface 712 that extends curvedly from the flat contact surface 713 such that the curved contact surface 712 is in sliding contact with the contact surfaces 522 of the teeth 521 of the toothed part 52 one by one and that the free end portion 710 of the engaging element 71 is retracted into the respective retaining recess 63 by pushing action of the teeth 521 of the toothed part 52 against urging action of the respective urging member 72 during rotation of the mounting seat 6 relative to the second fastener component 5 in a second direction (Y) (see FIGS. 4 and 5) opposite to the first direction (X).

Each of the retaining recesses 63 is defined by a recess-defining wall 64 that has an open end 641 and a closed end 642 opposite to the open end 641. Rotation of the mounting seat 6 relative to the second fastener component 5 in the first direction (X) results in a counter force (F) (see FIG. 3) that acts on each engaging element 71 to abut against the open end 641 of the recess-defining wall 64 of the respective retaining recess 63, thereby arresting rotation of the mounting seat 6 in the first direction (X). On the other hand, rotation of the mounting seat 6 in the second direction (Y) results in free retraction of each engaging element 71 into the respective retaining recess 63.

As in the prior art, the fastener of the present invention is used in conjunction with a lashing rope 8 (see FIGS. 1 and 2) to secure a cargo container to a deck fitting (not shown in the drawings). Fastening is accomplished by adjusting the threaded depth of the threaded shaft 51 of the second fastener component 5 in the screw hole 44 of the first fastener component 4 to provide a desired tension of the rope 8.

Figure 6:
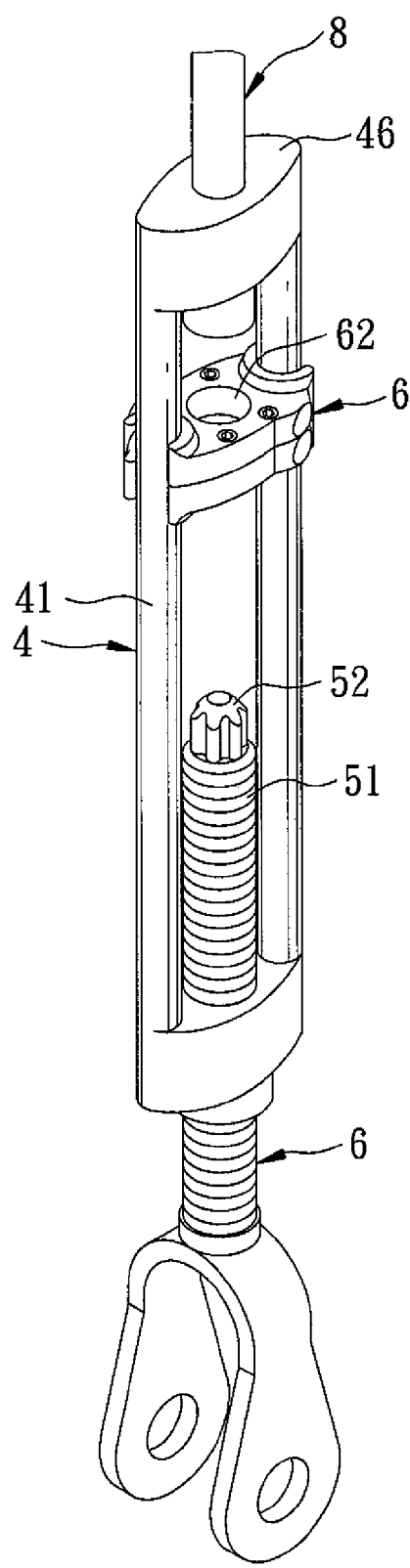
FIG. 6 is a perspective view of the preferred embodiment, showing how the mounting seat is disengaged from the second fastener component.

Referring to FIG. 6, to unfasten the cargo container, it is only necessary to apply an upward force on the mounting seat 6 so that the mounting seat 6 disengages from the threaded shaft 51 and slides upward along the rails 41 of the first fastener component 4 toward the second fixed body 46. The first fastener component 4 can thus be rotated as necessary to loosen the threaded shaft 51 from the screw hole 44.

With the configuration of the engaging elements 71 in the fastener of this invention, the contact area between each engaging element 71 and the toothed part 52 is enlarged, and the fastening effect can be enhanced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A fastener for securing a cargo container, comprising:
a first fastener component including first and second fixed bodies, and a pair of rails bridging said first and second fixed bodies, said first fixed body having a screw hole;
a mounting seat mounted slidably on said rails for sliding along said rails and having a central through-hole aligned with said screw hole in an axial direction, and a retaining recess in spatial communication with and extending in a tangential direction from said central through-hole;
a second fastener component including a threaded shaft extending threadedly through said screw hole in said first fixed body toward said second fixed body, and a toothed part extending axially from said threaded shaft into said central through-hole in said mounting seat and formed with a plurality of angularly displaced teeth, each of which has a contact surface extending in said axial direction; and
an engagement unit including an urging member that is mounted in said retaining recess in said mounting seat, and an engaging element that is mounted in said retaining recess in said mounting seat, that is urged by said urging member, and that has a free end portion extendable into said central through-hole in said mounting seat and in contact with at least one of said teeth upon relative rotation between said mounting seat and said second fastener component, said engaging element being movable in said tangential direction such that said free end portion can be retracted into said retaining recess in said mounting seat;
wherein said free end portion of said engaging element has a flat contact surface that extends in said tangential direction and said axial direction, and that extends into said central through-hole in said mounting seat to abut against said contact surface of an adjacent one of said teeth of said toothed part in such a manner to arrest rotation of said mounting seat relative to said second fastener component in a first direction; and
wherein said free end portion of said engaging element further has a curved contact surface that extends curvedly from said flat contact surface such that said curved contact surface is in sliding contact with said contact surfaces of said teeth of said toothed part one by one and that said free end portion of said engaging element is retracted into said retaining recess by pushing action of said teeth of said toothed part against urging action of said urging member during rotation of said mounting seat relative to said second fastener component in a second direction opposite to said first direction.

* * * * *